(12) United States Patent
Daprocida

(10) Patent No.: US 12,305,892 B2
(45) Date of Patent: May 20, 2025

(54) THERMOSIPHON GEOTHERMAL ENERGY RECOVERY SYSTEMS AND METHODS

(71) Applicant: Domenico Daprocida, Calgary (CA)

(72) Inventor: Domenico Daprocida, Calgary (CA)

(*) Notice: Subject to any disclaimer, the term of this patent is extended or adjusted under 35 U.S.C. 154(b) by 221 days.

(21) Appl. No.: 18/047,322

(22) Filed: Oct. 18, 2022

(65) Prior Publication Data

US 2023/0341152 A1    Oct. 26, 2023

Related U.S. Application Data

(63) Continuation of application No. PCT/IB2022/053854, filed on Apr. 26, 2022.

(51) Int. Cl.
*F28F 9/22* (2006.01)
*F24T 10/10* (2018.01)

(52) U.S. Cl.
CPC .................. *F24T 10/10* (2018.05)

(58) Field of Classification Search
CPC ....................................... F24T 10/10
USPC ........................................ 165/145
See application file for complete search history.

(56) References Cited

U.S. PATENT DOCUMENTS

| | | |
|---|---|---|
| 3,765,477 A | 10/1973 | Van Huisen |
| 9,376,885 B2 | 6/2016 | Bour et al. |
| 9,726,157 B2 | 8/2017 | Sweatman et al. |
| 10,385,666 B2 | 8/2019 | Stanecki et al. |
| 2007/0245729 A1 | 10/2007 | Mickleson |
| 2015/0354859 A1 | 12/2015 | March et al. |
| 2019/0154010 A1* | 5/2019 | Toews ............. F01K 25/08 |

FOREIGN PATENT DOCUMENTS

| | | |
|---|---|---|
| CA | 2922626 A1 | 3/2015 |
| CN | 208059337 U | 11/2018 |
| EP | 2674693 A2 | 5/2013 |
| WO | 20140081911 A2 | 5/2014 |
| WO | WO2020006620 A1 * | 1/2020 |

OTHER PUBLICATIONS

International search report, PCT/IB2022/053854, Jan. 24, 2023.

* cited by examiner

*Primary Examiner* — Davis D Hwu
(74) *Attorney, Agent, or Firm* — Lewellyn Law, PLLC; Stephen Lewellyn

(57) ABSTRACT

The present disclosure relates to systems and methods of geothermal energy production using a dual thermosiphon heat exchange system. In one system two working fluids in which a thermosiphon flow is induced to recover thermal energy from depth. The system has a subterranean heat exchanger that is formed into an underground formation by drilling, and which is flooded with a first working fluid. Heat from the formation is transferred into the first working fluid. A recovery loop extends from the earth's surface and into the heat exchanger and carries a second working fluid. Heat from the formation is transferred into the first working fluid, and heat from the first working fluid is transferred into the second working fluid. The heat flow from the formation into the first working fluid and from the first working fluid into the second working fluid causes a thermosiphon flow in the working fluids.

21 Claims, 6 Drawing Sheets

THERMOSIPHON GEOTHERMAL ENERGY RECOVERY SYSTEMS AND METHODS

CROSS-REFERENCE TO RELATED APPLICATIONS

This application is a continuation of PCT/IB2022/053854, filed on Apr. 26, 2022, the entirety of which is incorporated herein by reference.

FIELD OF THE INVENTION

The present disclosure relates to geothermal energy production and, more particularly, to geothermal energy recovery systems and methods.

BACKGROUND OF THE INVENTION

Geothermal Energy is classified as a "green" energy source by the United States Environmental Protection Agency. Subterranean heat exchangers are used to recover geothermal heat. These heat exchangers exchange energy with the earth by utilizing the earth's ambient temperature at depth. The worldwide use of ground source energy for various purposes is increasing.

Accordingly, there is a need and desire for improved systems and methods for recovering and using geothermal energy that have a lower carbon footprint and an increased efficiency.

SUMMARY OF THE INVENTION

The present disclosure provides for thermosiphon geothermal energy recovery systems and methods for recovering geothermal energy at the earth's surface.

In one aspect, a dual thermosiphon geothermal energy recovery system is provided. The system includes a subterranean heat exchanger formed in an underground formation that is formed by drilling the formation to form the heat exchanger structure. The subterranean heat exchanger has a vertical section extending toward the ground surface and a plurality of loop sections. Each loop section is connected at one end to the vertical section at a first depth and connected at a second end to the vertical section at a second depth that is different from the first depth as measured from the ground surface. A first working fluid is disposed in the subterranean heat exchanger such that heat from the formation is transferred to the first working fluid. A recovery loop extends from the ground surface and into the vertical section of the subterranean heat exchanger. The recovery loop is configured for a closed-loop flow of a second working fluid that is disposed within the recovery loop between the ground surface and a downhole location in the vertical section. The subterranean heat exchanger and the recovery loop are configured such that heat from the first working fluid is transferred to the second working fluid, thereby heating the second working fluid and causing a closed-loop thermosiphon flow in the second working fluid in the recovery loop. The subterranean heat exchanger and recovery loop are further configured such that heat transferred from the first working fluid to the second working fluid causes a closed-loop thermosiphon flow in the first working fluid within the subterranean heat exchanger with the first working fluid flowing through the vertical section in a downhole direction and in the loop sections in an up-hole direction between the first and second depths.

To this end, the second working fluid, in the recovery loop, makes a closed-loop flow between the ground surface and the heat exchanger at depth. And the first working fluid, in the heat exchanger, makes a closed-loop flow between therewithin. At the surface, heat is removed from the second working fluid and recovered heat can be used by a geothermal facility.

In another aspect, a thermosiphon geothermal well system comprising is provided. The system has first subterranean heat exchanger that is formed in an underground formation. The first subterranean heat exchanger comprises a first vertical section that extends toward the ground surface and a plurality of loop sections. Each loop section is connected at one end to the first vertical section at a first depth and connected at a second end to the first vertical section at a second depth that is different from the first depth as measured from the ground surface.

A second subterranean heat exchanger is formed in the underground formation at a greater depth than the first subterranean heat exchanger. The second subterranean heat exchanger has a second vertical section and a plurality of legs sections that are connected to the second vertical section. A dip tube extends from a bottom of the first vertical section and into the second vertical section. The dip tube fluidically connects the first vertical section and the second vertical section, thereby allowing a fluidic flow downwardly from the first vertical section into the second vertical section.

A working fluid disposed in the first and second subterranean heat exchangers such that heat from the formation is transferred to the working fluid. A recovery conduit is connected to the first vertical section at a location near the surface and is configured to receive the working fluid and conduct the working fluid to the surface. A return conduit extends into the first vertical section from the surface and terminates at an open end at a location in the first vertical section approximate the dip tube.

In aspects, the recovery conduit can extend into the first vertical section from the surface and terminate at an open end at a location in the first vertical section approximate where one or more loop section connects with the first vertical section at the first depth.

In another aspect, a thermosiphon geothermal well system is provided. The system includes a subterranean heat exchanger formed in an underground formation. The subterranean heat exchanger has a vertical section and at least two legs sections extending from a bottom of the vertical section. A working fluid disposed in the subterranean heat exchanger such that heat from the formation is transferred to the working fluid. A recovery conduit is configured to recover the working fluid at the surface. A return conduit extends into the vertical section and terminates at an open end at a location in near a junction between the vertical section at least one leg section. The return conduit has at least one mixer and the mixer is configured to permit heated working fluid disposed in the vertical section to flow into the return conduit and mix with cool working fluid flowing downwardly through the return conduit.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
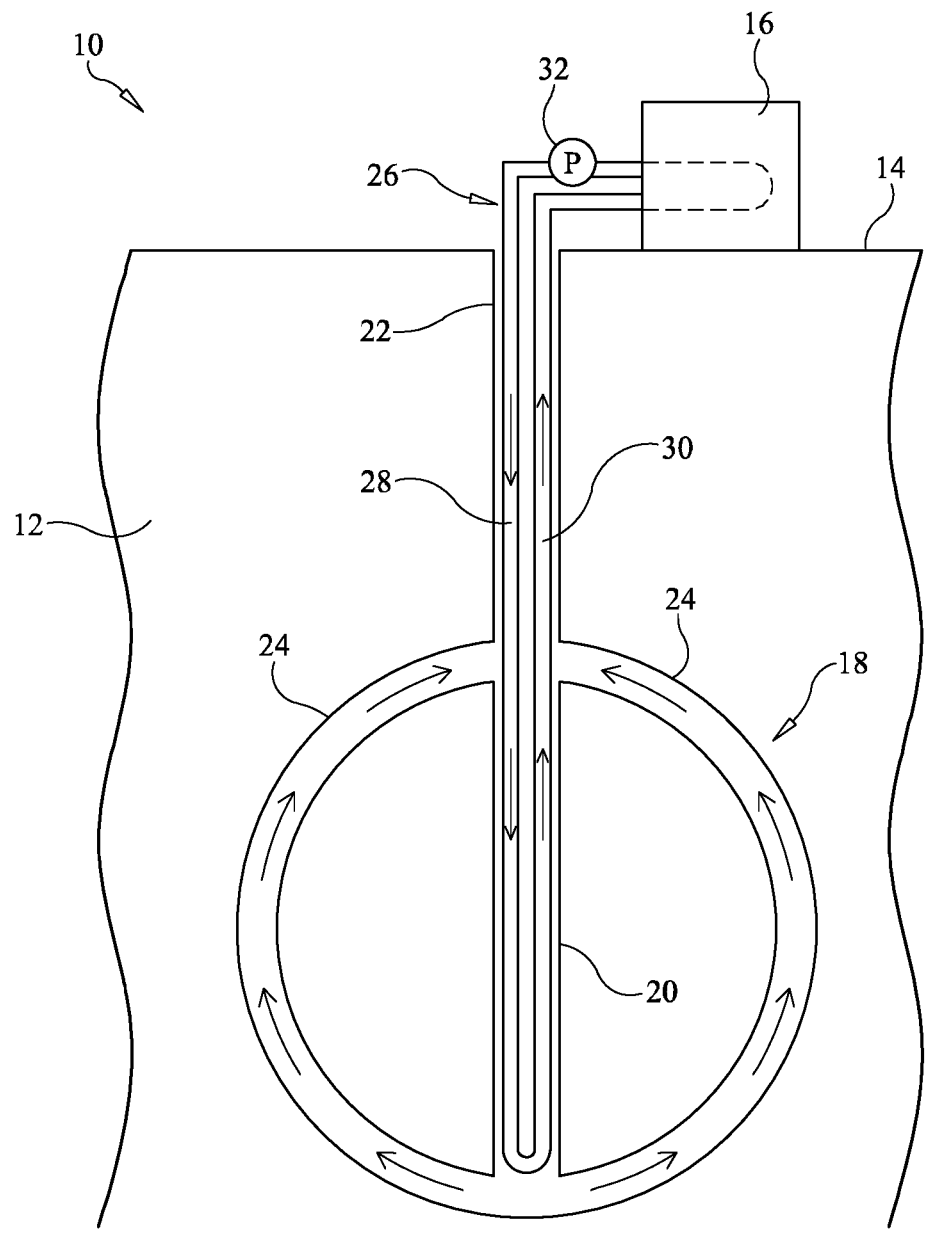
FIG. 1 illustrates diagrammatic view of a dual thermosiphon geothermal energy recovery system according to one or more embodiments.
Figure 2:
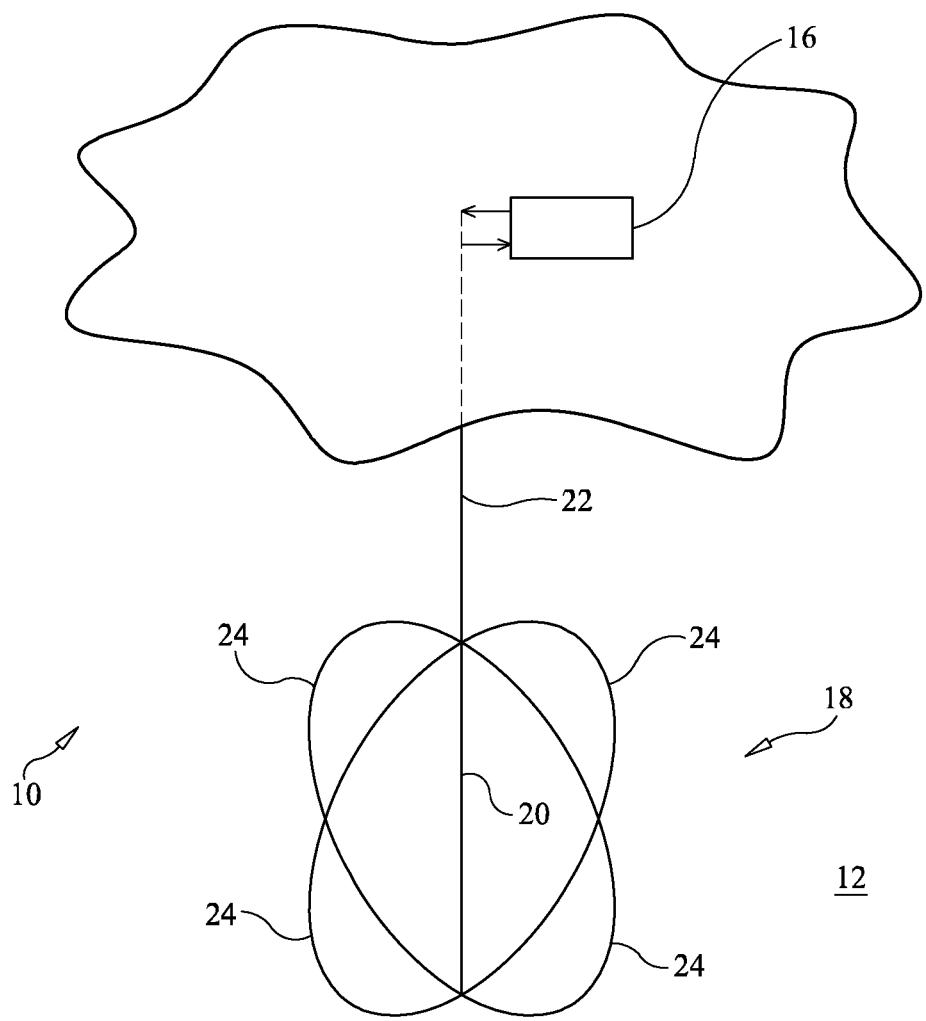
FIG. 2 illustrates a diagrammatic view of a dual thermosiphon geothermal energy recovery system according to one or more embodiments.

Referring to FIGS. 1 and 2 of the drawings, there is diagrammatically illustrated a dual thermosiphon geothermal energy recovery system 10 in accordance with at least one embodiment. System 10 is used in extracting heat from a subterranean formation 12 for use at the surface 14 by a geothermal facility 16. The geothermal facility 16 can be used in electrical power generation, heating, desalination, and in many other systems that can use geothermal heat energy.

The system includes a subterranean heat exchanger 18 that is formed in the formation 12 by drilling boreholes in the formation to produce the heat exchanger structure. The heat exchanger 18 is formed in the formation 12 at a depth having a desired geothermal temperature. The heat exchanger 18 includes a vertical section 20 that is formed in the formation by drilling a borehole 22 into the formation from the surface 14. The heat exchanger further includes a plurality of radiator legs or loop section 24 that are drilled in the formation 12 such that each loop section is joined at one end to the vertical section 20 at a first depth and connected at a second end to the vertical section at second depth that is different from the first depth as measured from the ground surface.

In embodiments the difference between the depths may be 500 meters to 7 kilometers. For instance, a loop section 24 can be formed by directionally drilling boreholes laterally outward into the formation from a location near the bottom of the borehole 22 (bottom of the vertical section 20) and then upwardly toward the surface 14 and then laterally back to the borehole. In embodiments, as best seen in FIG. 2, the loop sections 24 can be formed radially around the vertical section 20 (borehole 22).

A first heat transfer working fluid is injected or disposed in the heat exchanger 18 with a sufficient volume to fill or flood the loop sections 24 and the vertical section 20 to a location above where the loop sections join the vertical section. That is, the entire borehole 22 is not flooded with the first working fluid to the surface. Heat from the surrounding formation 12 is transferred into the first working fluid which heats the first working fluid. In embodiments, the boreholes forming the heat exchanger 18 maybe uncased thereby providing a direct contact between the first working fluid and the bare surface of the formation such that heat from the formation is transferred directly to the first working fluid without having to pass across a casing. The formation 12 in which the heat exchanger 18 is formed can be fractured to increase fluid permeation in the formation and increase heat transfer between the formation and the first working fluid.

System 10 further includes a recovery loop 26 extending from the ground surface 14 and into the vertical section 20 of the heat exchanger 18. The recovery loop 26 is filled with a second heat transfer working fluid and is configured for a closed-loop flow of the second working between the ground surface and a downhole location in the vertical section. In embodiments, the recovery loop 26 has first and second conduits 28 and 30 that extend from the ground surface 14 and into the vertical section 20 of the heat exchanger 18. The conduits 28 and 30 are fluidically connected at their downhole ends located within the vertical section of the subterranean heat exchanger to allow the second working fluid to flow downwardly through one conduit and then upwardly through the other.

The heat exchanger 18 and the recovery loop 26 are configured such that heat from the first working fluid that is in the vertical section 20 is transferred to the second working fluid, thereby heating the second working fluid. The thermosiphon flow is caused by a vertical temperature gradient (as referenced to the ground surface) in the second working fluid in the recovery loop 26, wherein the temperature is greater at depth than at the surface and by the temperature difference in conduits 26 and 28.

The heat exchanger 18 and recovery loop 26 are further configured such that heat transferred from the first working fluid, which is in the vertical section 20, to the second working fluid causes a closed-loop thermosiphon flow in the first working fluid within the heat exchanger. Particularly, as heat is transferred from the first working fluid that is in the vertical section 20 to the second working fluid in the recovery loop, the temperature of the first working fluid in the vertical section lowers to a temperature that is less than the temperature of the fluid located in the loop sections 24, thereby creating a temperature gradient in the first working fluid in the heat exchanger. This temperature gradient causes the thermosiphon flow in the heat exchanger 18 with the first working fluid flowing through the vertical section in a downhole direction and flowing in the loop sections in an up-hole direction between the first and second depths. In other words, a closed-loop thermosiphon flow is established in the first working fluid as shown by the flow directional arrows as seen in FIG. 1.

At the surface, heat is extracted from the first working fluid flowing in the recovery loop by the surface heat exchanger 16 for extracting energy. The cooler fluid is then circulated back down into the heat exchanger 18 where it is once again heated and returned to the surface via the thermosiphon flow. Moreover, the cooled second working fluid in conduit 28 contributes further to the thermosiphon induced into the first working fluid.

To this end, the system 10 can operate entirely without electric pumps to circulate the working fluids, which increases the efficiency of the system and reduces its carbon footprint. However, in embodiments, the system 10 may optionally include a pump 32 operatively connected to the recovery loop 26 and operated to initially stimulate fluid flow in the recovery loop. Once a flow is established, the pump can be stopped. The pump 32 may also be operated continuously or intermittently to create a desired fluid flow in the recover loop.

The boreholes formed into the formation 12 may be cased with one or more linings. The linings may be constructed of a thermally conductive material and/or the linings may be constructed of a thermally non-conductive material. For example, borehole 22 could be lined with a thermally non-conductive lining that extends from the surface to near the junction between loops 24 and section 20. The loops 24 and section 20 could be lined with a thermally conductive lining.

Figure 3:
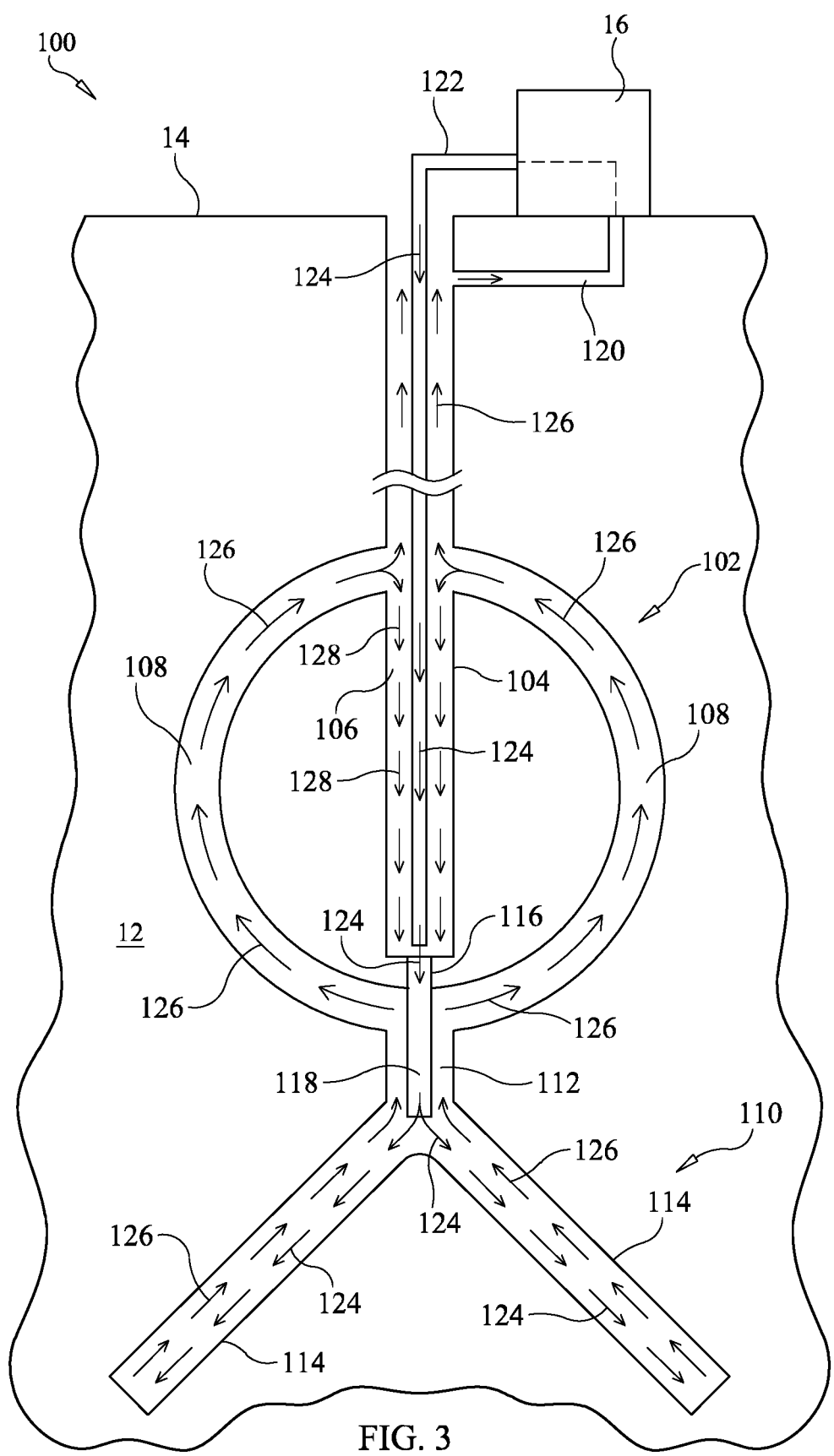
FIG. 3 illustrates a diagrammatic view of a thermosiphon geothermal energy recovery system according to one or more embodiments.

With reference to FIG. 3, there is diagrammatically illustrated a geothermal energy recovery system 100 in accordance with at least one embodiment. System 100, like system 10 described above, is constructed, and operated to extract heat from a subterranean formation 12 for use at the surface 14 by a geothermal facility 16.

System 100 includes a subterranean heat exchanger 102 that is formed in the formation 12 by drilling boreholes in the formation to produce the heat exchanger structure. The heat exchanger 102 is formed in the formation 12 at a depth having a desired geothermal temperature and has a construction like heat exchanger 18, previously described in connection with system 10. The heat exchanger 102 includes a vertical section 104 that is formed in the formation by drilling a borehole 106 into the formation from the surface 14. The heat exchanger further includes a plurality of radiator legs or loop section 108 that are drilled in the formation 12 such that each loop section is joined at one end to the vertical section 104 at a first depth and connected at a second end to the vertical section at second depth that is different from the first depth as measured from the ground surface.

In embodiments the difference between the depths may be 500 meters to 7 kilometers. For instance, a loop section 108 can be formed by directionally drilling boreholes laterally outward into the formation from a location near the bottom of the borehole 106 (bottom of the vertical section 104) and then upwardly toward the surface 14 and then laterally back to the borehole. Like system 10, in embodiments, the loop sections 108 can be formed radially around the vertical section 104.

System 100 includes a second subterranean heat exchanger 110 that is formed in the formation 12 a greater depth than the first heat exchanger 102. The second heat exchanger 110 is formed in the formation by drilling boreholes into the formation to produce the heat exchanger structure. The heat exchanger 110 includes a vertical section 112 and a plurality of legs sections 114 that extend from the vertical section and into the formation 12. The vertical section 112 and the leg sections 114 are formed by respective boreholes drilled into the formation 12. The vertical section 112 is connected to the loop sections 108 of the first heat exchanger 102. The bottom of borehole 106 is continued with another borehole 116 that is smaller in diameter than borehole 106 to form a shoulder or narrowed section. A flanged dip tube 118 is supported on the shoulder and extends downwardly through borehole 116 and into the vertical section 112 where it terminates at an open end approximate the junction between the vertical section 112 and the leg sections 114 and is in fluidic communication therewith.

A heat transfer working fluid is injected or disposed in the heat exchangers 102 and 110 with a sufficient volume to fill or flood the heat exchanger structures and the vertical section 104 to a location approximate the surface 14. Heat from the surrounding formation 12 is transferred into the working fluid which heats the working fluid. In embodiments, the boreholes forming the heat exchanger 102, heat exchanger 110, or both maybe uncased thereby providing a direct contact between the first working fluid and the bare surface of the formation such that heat from the formation is transferred directly to the first working fluid without having to pass across a casing. The formation 12 in which the heat exchanger 102, heat exchanger 110, or both is formed can be fractured to increase fluid permeation in the formation and increase heat transfer between the formation and the first working fluid.

System 100 further includes a recovery connection 120 and a return connection 122. The recovery connection 120 can be provided by a conduit or that is connected at one end to receive the working fluid from the vertical section 104 at a position near or at the surface. The recovery connection 120 is connected at the opposite end to a geothermal facility 16. The return connection 112 can be provided by a conduit that is connected at one end to the geothermal facility. The conduit 112 is run into the vertical section 104 where it terminates at an open end within the vertical section 104 at a position below the upper connection of loops 108 to the vertical section. In embodiments, the conduit 112 is terminated near the bottom of the vertical section in proximity to the upper end of the dip tube 118.

In operation, heat from the formation 12 is transferred into the working fluid and this heat is recovered at the surface 14 and used by geothermal facility 16. The structure and configuration of the first and second heat exchangers 102 and 110, and the conduits 120 and 112 encourage a natural thermosiphon flow of the working fluid through the heat exchangers. This natural thermosiphon flow is caused by a temperature difference between working fluid in the heat exchangers and cooler working fluid that is injected into the heat exchangers from the surface.

Specifically, heated working fluid is recovered via conduit 120 and is used by the geothermal facility 16 to extract the heat from the working fluid. The now cooler working fluid 124 is injected back into the heat exchangers 102 and 110 via the return conduit 122 that extends through the vertical section 104 and terminates near the bottom thereof at a location approximate the upper open end of the dip tube 116. This returned working fluid 124, much cooler than the working fluid in the heat exchangers, continues to flow downwardly through the dip tube 116 and into the legs 114 because of the temperature difference. In legs 114 the cooler or injected working fluid is once again heated and starts flowing upwardly in the legs as heated working fluid 126. The upward flow is caused by a temperature differential between the injected, cooler working fluid 124 flowing into the legs 114 and the working fluid 126 that has been heat by the formation 12.

The heated working fluid 126 continues to be heated and rise through the legs 114 and then into the bottoms of the loop sections 108, and then upwardly through the loop section where it further is heated. At the top of the loop sections 108, where they connect with the vertical section 104, a portion of the heated working fluid 126 continues to rise toward the surface. Another portion of the heated working fluid 128 is caused to flow downwardly in and through the vertical section 104 by a natural flow created by temperature difference between cooler injected working fluid 124 flowing through the vertical section 104 in conduit 122 and heated working fluid 126. At the bottom of the vertical section 104, working fluid 128 joins with working fluid 124 and flows therewith as described above.

To this end, a thermosiphon flow of the working fluid exists within the heat exchangers 102 and 110. This naturally occurring thermosiphon flow increases the efficiency of the system and reduces its carbon footprint. In embodiments, the system 100 may optionally include one or more pumps (not shown) operatively connected to the string 120 and string 122 to recover heated fluid from the well and to injected cooled fluid back into the well. The pumps may be operated continuously or intermittently to create a desired fluid flow in the system.

Figure 4:
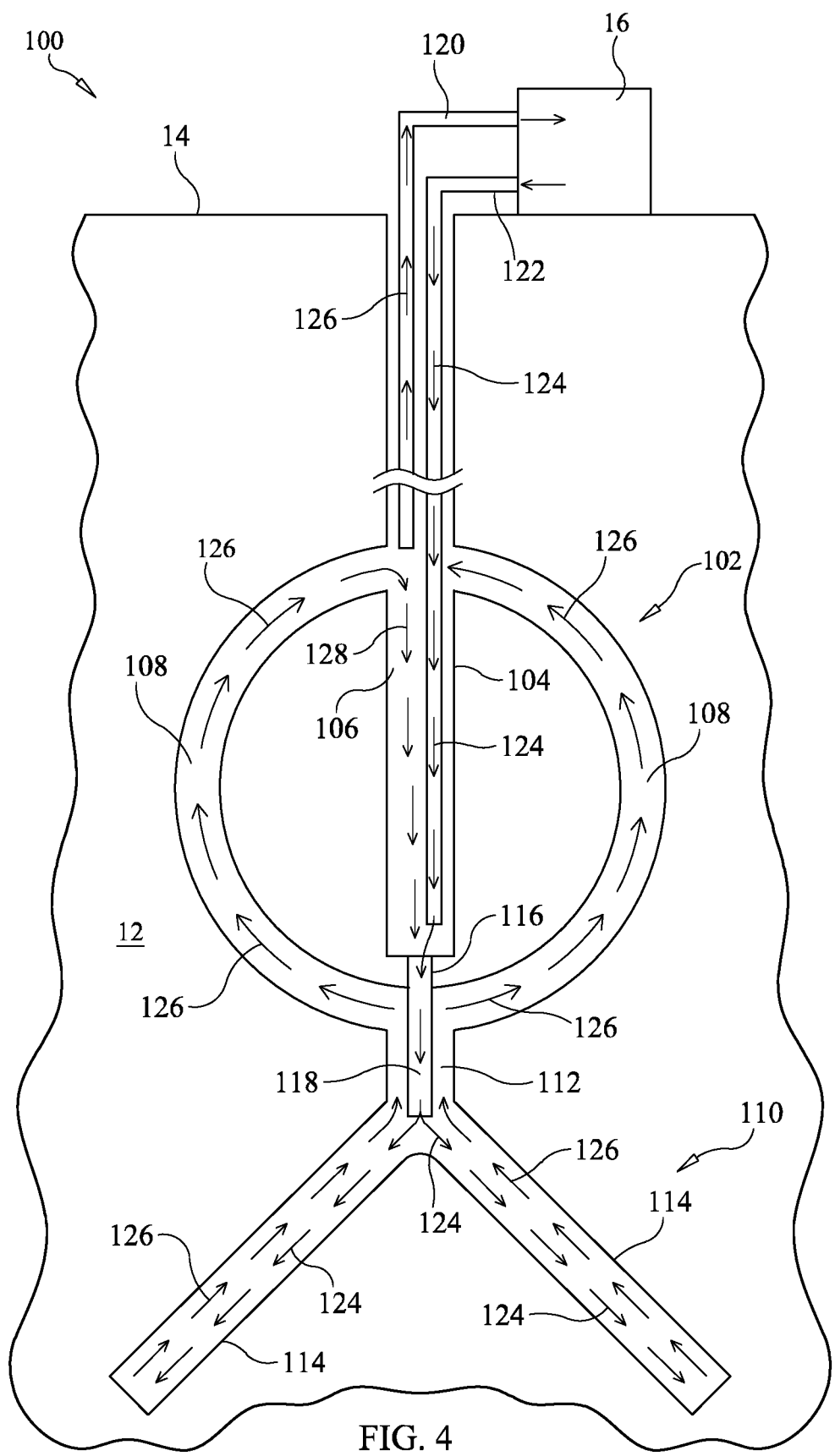
FIG. 4 illustrates a diagrammatic view of a thermosiphon geothermal energy recovery system according to one or more embodiments.

With reference to FIG. 4, system 100 is diagrammatically shown with an alternative recovery arrangement. In the depicted arrangement, conduit 120' extends into the vertical section 104 from the surface and terminates at an open end near the junction between the loops 108 and the vertical section. In this manner, heated working fluid 126 is recovered through the conduit 120' at a great depth from the surface than it is recovered through conduit 120. This arrangement reduced the volume of working fluid needed to fill the bore holes forming the heat exchangers 102 and 110.

The boreholes formed into the formation 12 may be cased with one or more linings. The linings may be constructed of a thermally conductive material and/or the linings may be constructed of a thermally non-conductive material. For example, borehole 104 could be lined with a thermally non-conductive lining that extends from the surface to near the junction between loops 108 and section 106. The loops 108 and section 106 could be lined with a thermally conductive lining. Similarly, legs 114 could be lined with a thermally conductive lining.

Figure 5:
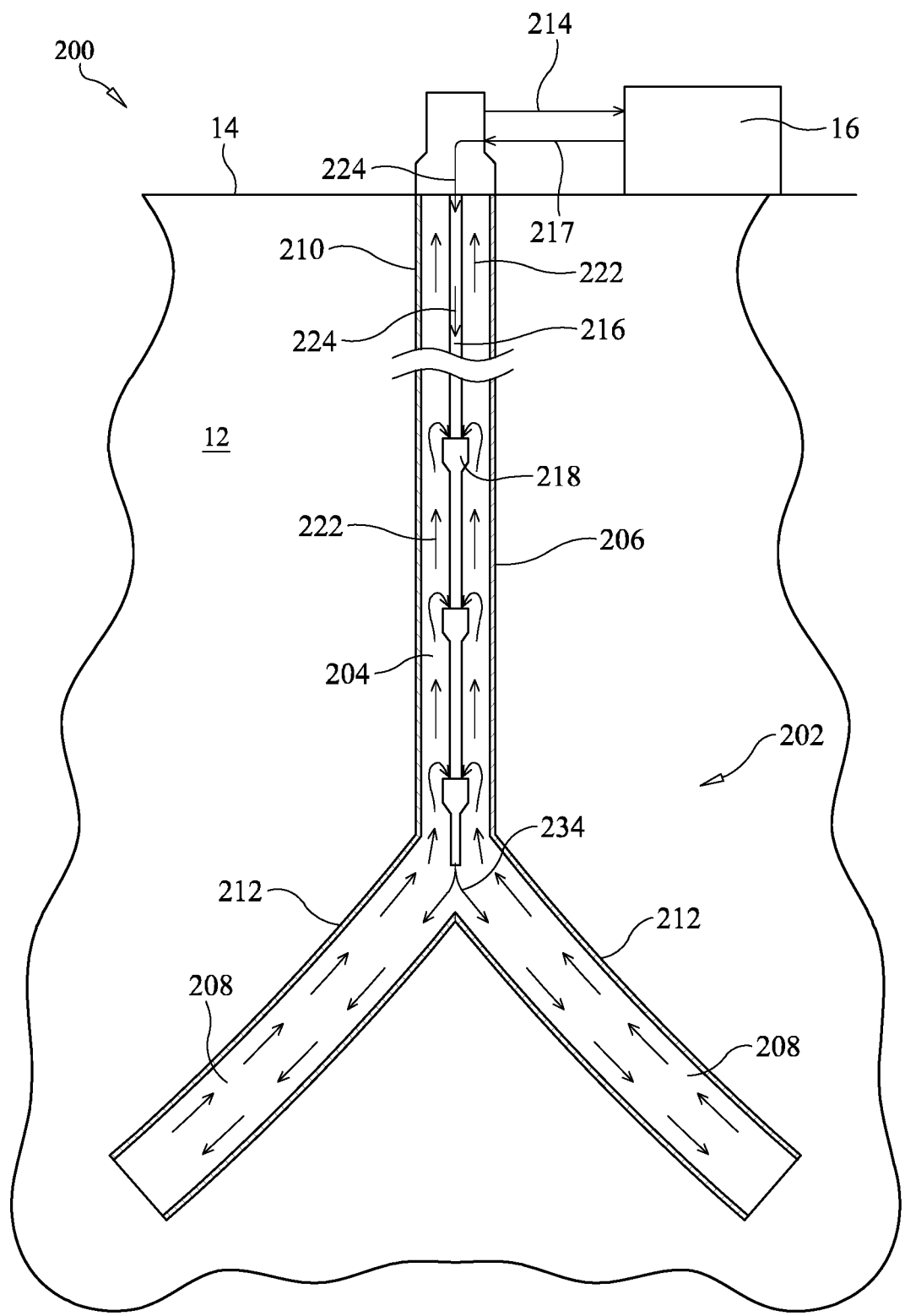
FIG. 5 illustrates a diagrammatic view of a thermosiphon geothermal energy recovery system according to one or more embodiments.
Figure 6:
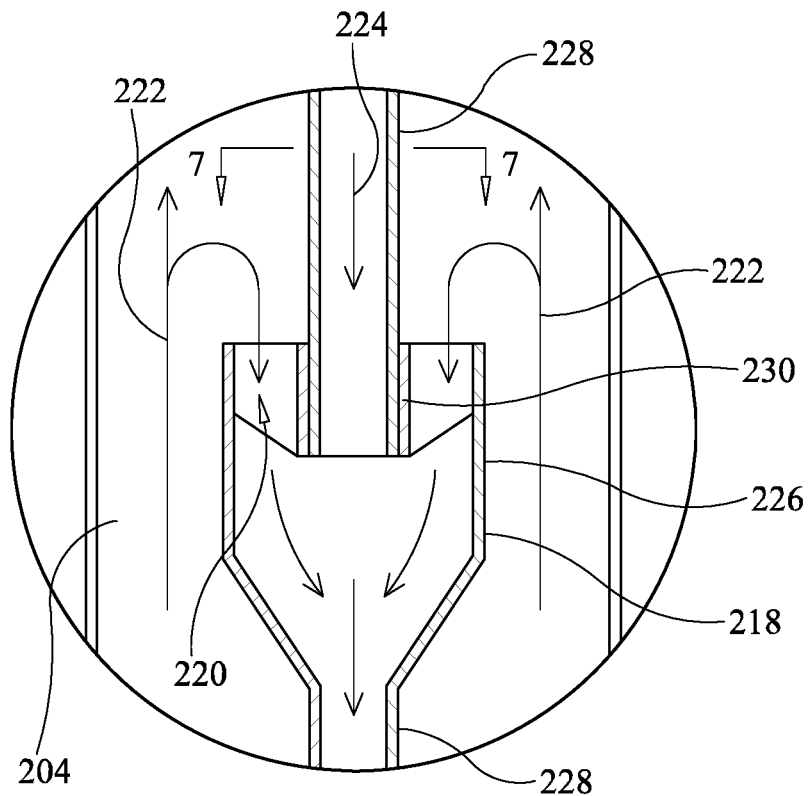
FIG. 6 is an enlarged partial view of the thermosiphon geothermal energy recovery system of FIG. 5.
Figure 7:
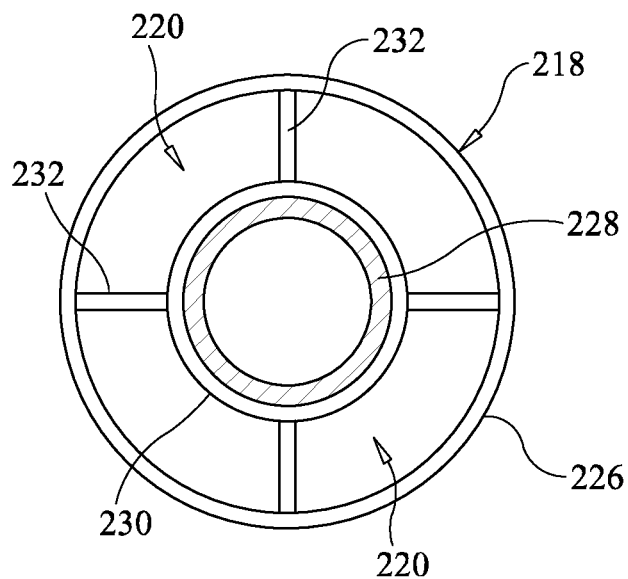
FIG. 7 is a cross-sectional view taken along line 7-7 in FIG. 6.

In FIGS. 5-7 there is diagrammatically illustrated a geothermal energy recovery system 200 in accordance with at least one embodiment. System 200, like systems 10, 100, and 100' described above, is constructed, and operated to extract heat from a subterranean formation 12 for use at the surface 14 by a geothermal facility 16.

System 200 includes a subterranean heat exchanger 202 that is formed in the formation 12 by drilling boreholes in the formation to produce the heat exchanger structure. The heat exchanger 202 is formed in the formation 12 at a depth having a desired geothermal temperature. The heat exchanger 202 includes a vertical section 204 that is formed in the formation by drilling a borehole 206 into the formation from the surface 14. The heat exchanger 202 a plurality of legs sections 208 that extend from or near the bottom of the vertical section 204 and into the formation 12. The leg sections 208 are formed by respective boreholes drilled into the formation 12.

A heat transfer working fluid is injected or disposed in the heat exchanger 202 with a sufficient volume to fill or flood the heat exchanger structure and the vertical section 204 to a location approximate the surface 14 or completely to the surface. Heat from the surrounding formation 12 is transferred into the working fluid which heats the working fluid.

In embodiments, the boreholes forming the heat exchanger 202 maybe uncased thereby providing a direct contact between the working fluid and the bare surface of the formation such that heat from the formation is transferred directly to the working fluid without having to pass across a casing. The formation 12 in which the legs 208 are formed can be fractured to increase fluid permeation in the formation and increase heat transfer between the formation and the first working fluid.

In embodiments, the boreholes formed into the formation 12 may be cased with one or more linings. The linings may be constructed of a thermally conductive material and/or the linings may be constructed of a thermally non-conductive material. For example, borehole 206 could be lined with a thermally non-conductive lining 210 that extends from the surface to near the junction between section 204 and the legs 208. Then the boreholes forming the legs 208 could be lined with a thermally conductive lining 212.

System 200 further includes a recovery connection 214 and a return connection 217. The recovery connection 214 can be provided by a conduit connected at one end to receive heated working fluid 222 from the vertical section 204 at a position near or at the surface. For example, as depicted, the recovery connection 214 is connected to a wellhead or similar structure located at the surface. The recovery connection 214 is connected at the opposite end to a geothermal facility 16. The return connection 214 can be provided by a conduit that is connected at one end to the geothermal facility 16. The conduit can include a string 216 that is run into the vertical section 204 where it terminates within the vertical section at a position near the junction between the legs 208 and the vertical section. Cool fluid 224 from the facility 16 is injected through the string 216 and into the heat exchanger 202.

The string 216 includes one or more fluid mixers 218 spaced along the length of the string. As best seen in FIG. 6, each fluid mixer 218 has one or more passages 220 that establish a fluid connection with the vertical section 204. The passages 220 allow for heated fluid 222 in the vertical section 204 to be drawn into the string 216 and mix with cool fluid 224, the purpose of which is described herein below.

In the depicted embodiment, each mixer 218 includes a cup-like section 226 that is open at its top end and a conduit section 228 that extends from the cup-like section. The mixer 218 further includes a coupling 230 that is configured to receive the end of a conduit of the string 216 for connecting the mixer to the conduit and thus the string. The coupling 228 is supported by flanges 232 that are spaced around the coupling, as best seen in FIG. 7. With reference to FIG. 5, as depicted, the upper most mixer 218 is connected to a conduit section of the string 216, and then the next lower mixer is connected to the conduit section of 228 of the previous mixer. In this way, a plurality of mixers 218 can be connected in series to form a length of the string 216 as desired.

It is important to note that other mixer configurations could be employed to achieve the desired result of allowing mixing of the heated fluid located in the vertical section 204 with the cool fluid 224 flowing through the string 216. Accordingly, the system 200 should not be limited to the particularly described and depicted mixer 218, unless the specific structure is specified to be a requirement in one or more embodiments.

In operation, heat from the formation 12 is transferred into the working fluid and this heat is recovered at the surface 14 and used by geothermal facility 16. The structure and configuration of the heat exchangers 202 and string 216 encourage a natural thermosiphon flow of the working fluid through the heat exchanger. This natural thermosiphon flow is caused by a temperature difference between working fluid in the heat exchanger and cooler working fluid that is injected into the heat exchanger from the surface.

Specifically, heated working fluid 222 is recovered via conduit 214 and is used by the geothermal facility 16 to extract the heat from the working fluid. Cool working fluid 224 is injected back into the heat exchanger 202 via the string 216. The cool fluid 224 flows down the string 216 and is deposited into the first mixer 218, where it mixes with hot fluid 222 flowing into the mixer before it continues to flow down the string to the next mixer where it mixes with additional heated fluid, further warming the cool fluid. This process is repeated for every mixer 218 along the string. After passing through all the mixers 218, the cool fluid 224 is now prewarmed, and deposited into the intersection or junction between the vertical section 204 and the legs 208. The warmed fluid 234 flows into the legs 208 where it heats up and starts to rise back toward the surface.

A thermosiphon is created as the cool fluid falls due to the higher density of the cool fluid in relation to the surrounding heated fluid, while the heated fluid rises. To this end, a thermosiphon flow of the working fluid exists within the heat exchangers 202. This naturally occurring thermosiphon flow increases the efficiency of the system and reduces its carbon footprint. In embodiments, the system 200 may optionally include one or more pumps (not shown) operatively connected to the string 216 and/or recovery connection 217 to recover heated fluid from the well and to injected cooled fluid back into the well. The pumps may be operated continuously or intermittently to create a desired fluid flow in the system.

While the invention has been particularly shown and described with respect to the illustrated embodiments thereof, it will be understood by those skilled in the art that the foregoing and other changes in form and details may be made therein without departing from the spirit and scope of the invention. Further the configuration and arrangement of the invention should not be limited solely to those shown in the figures of the drawings. As a non-limiting example, the direction and configuration of the described conduits and boreholes forming the heat exchangers, as well as other the components of the systems may be oriented differently depending on geological conditions. Further the boreholes could be open or closed at the surface.

Accordingly, the foregoing detailed description is to be clearly understood as being given by way of illustration and example only, the spirit and scope of the present invention being limited solely by the appended claims and their equivalents.

What is claimed is:

1. A thermosiphon geothermal well system comprising:
a subterranean heat exchanger formed in an underground formation, the subterranean heat exchanger comprising a vertical borehole section formed into the underground formation and having a first end and an opposite second end, and a plurality of loop borehole sections formed into the underground formation, each loop borehole section connected at one end to the vertical borehole section at a first depth in the formation and connected at a second end to the vertical borehole section at a second depth in the formation that is different from the first depth as measured from the ground surface;
a first working fluid disposed in the subterranean heat exchanger such that heat from the formation is transferred to the first working fluid;
a recovery loop extending from the ground surface and into the vertical borehole section of the subterranean heat exchanger, the recovery loop configured for a closed-loop flow of a second working fluid disposed within the recovery loop between the ground surface and a downhole location in the vertical borehole section;
wherein the subterranean heat exchanger and the recovery loop are configured such that heat from the first working fluid is transferred to the second working fluid, thereby heating the second working fluid; and
wherein the subterranean heat exchanger and recovery loop are further configured such that heat transferred from the first working fluid to the second working fluid causes a closed-loop thermosiphon flow in the first working fluid within the subterranean heat exchanger with the first working fluid flowing through the vertical borehole section in a downhole direction and in the loop borehole sections in an up-hole direction between the first and second depths.

2. The thermosiphon geothermal well system of claim 1, wherein the recovery loop has first and second conduits extending from the ground surface that are fluidically connected at their downhole ends located within the vertical borehole section of the subterranean heat exchanger.

3. The thermosiphon geothermal well system of claim 1, further comprising:
a pump connected to the recovery loop and operable to stimulate a closed-loop flow of the second working fluid within the recover loop.

4. The thermosiphon geothermal well system of claim 1, wherein the loop borehole sections of the subterranean heat exchanger are arranged radially around the vertical borehole section of the subterranean heat exchanger.

5. The thermosiphon geothermal well system of claim 1, wherein the first working fluid is in direct contact with the underground formation such that heat from the formation is transferred directly to the first working fluid.

6. A method of extracting thermal energy from a subterranean formation comprising:
forming a subterranean heat exchanger in an underground formation, the subterranean heat exchanger comprising a vertical borehole section formed into the underground formation and having a first end and an opposite second end, and a plurality of loop borehole sections formed into the underground formation, each loop borehole section connected at one end to the vertical borehole section at a first depth in the formation and connected at a second end to the vertical borehole section at a second depth in the formation that is different from the first depth as measured from the ground surface;

providing a first working fluid in the subterranean heat exchanger n such that heat from the underground formation is transferred to the first working fluid;

providing a recovery loop extending from the ground surface and into the vertical borehole section of the subterranean heat exchanger, the recovery loop configured for a closed-loop flow of a second working fluid disposed within the recovery loop between the ground surface and a downhole location in the vertical borehole section;

transferring heat from the first working fluid to the second working fluid, thereby heating the second working fluid and inducing a closed-loop thermosiphon flow in the second working fluid in the recovery loop;

causing a closed-loop thermosiphon flow in the first working fluid within the subterranean heat exchanger with the first working fluid flowing through the vertical borehole section in a downhole direction and in the loop borehole sections in an up-hole direction between the first and second depths; and recovering heat from the second working fluid at the ground surface.

7. The method of claim 6, further comprising:
using the heat recovered by the second working fluid at the surface in the generation of electricity.

8. The method of claim 6, further comprising:
stimulating a closed-loop flow in the second working fluid in the recovery loop.

9. The method of claim 8, further comprising:
providing a pump that is operatively connected to the recovery loop and operating the pump to stimulate the closed-loop flow.

10. The method of claim 6, wherein the recovery loop has first and second fluid conduits extending from the ground surface that are fluidically connected at their downhole ends located within the vertical borehole section of the subterranean heat exchanger.

11. The method of claim 6, wherein the loop borehole sections of the subterranean heat exchanger are arranged radially around the vertical borehole section of the subterranean heat exchanger.

12. The method of claim 6, wherein in the forming a subterranean heat exchanger, the subterranean heat exchanger is formed by drilling the underground formation.

13. The method of claim 6, wherein the first working fluid is in direct contact with the underground formation such that heat from the formation is transferred directly to the first working fluid.

14. A thermosiphon geothermal well system comprising:
a subterranean heat exchanger formed in an underground formation, the subterranean heat exchanger comprising a vertical section extending toward the ground surface and a plurality of loop sections, each loop section connected at one end to the vertical section at a first depth and connected at a second end to the vertical section at a second depth that is different from the first depth as measured from the ground surface;
a first working fluid disposed in the subterranean heat exchanger such that heat from the formation is transferred to the first working fluid;
a recovery loop extending from the ground surface and into the vertical section of the subterranean heat exchanger, the recovery loop configured for a closed-loop flow of a second working fluid disposed within the recovery loop between the ground surface and a downhole location in the vertical section;

wherein the subterranean heat exchanger and the recovery loop are configured such that heat from the first working fluid is transferred to the second working fluid, thereby heating the second working fluid;

wherein the subterranean heat exchanger and recovery loop are further configured such that heat transferred from the first working fluid to the second working fluid causes a closed-loop thermosiphon flow in the first working fluid within the subterranean heat exchanger with the first working fluid flowing through the vertical section in a downhole direction and in the loop sections in an up-hole direction between the first and second depths; and a pump connected to the recovery loop and operable to stimulate a closed-loop flow of the second working fluid within the recover loop.

15. The thermosiphon geothermal well system of claim 14, wherein the loop sections of the subterranean heat exchanger are arranged radially around the vertical section of the subterranean heat exchanger.

16. The thermosiphon geothermal well system of claim 14, wherein the first working fluid is in direct contact with the underground formation such that heat from the formation is transferred directly to the first working fluid.

17. A method of extracting thermal energy from a subterranean formation comprising:
forming a subterranean heat exchanger in an underground formation, the subterranean heat exchanger comprising a vertical section extending toward the ground surface and a plurality of loop sections, each loop section connected at one end to the vertical section at a first depth and connected at a second end to the vertical section at a second depth that is different from the first depth as measured from the ground surface;

providing a first working fluid in the subterranean heat exchanger such that heat from the underground formation is transferred to the first working fluid;

providing a recovery loop extending from the ground surface and into the vertical section of the subterranean heat exchanger, the recovery loop configured for a closed-loop flow of a second working fluid disposed within the recovery loop between the ground surface and a downhole location in the vertical section;

transferring heat from the first working fluid to the second working fluid, thereby heating the second working fluid and inducing a closed-loop thermosiphon flow in the second working fluid in the recovery loop;

causing a closed-loop thermosiphon flow in the first working fluid within the subterranean heat exchanger with the first working fluid flowing through the vertical section in a downhole direction and in the loop sections in an up-hole direction between the first and second depths;

recovering heat from the second working fluid at the ground surface; and providing a pump that is operatively connected to the recovery loop and operating the pump to stimulate the closed-loop flow.

18. The method of claim 17, wherein the recovery loop has first and second fluid conduits extending from the ground surface that are fluidically connected at their downhole ends located within the vertical section of the subterranean heat exchanger.

19. The method of claim 17, wherein the loop sections of the subterranean heat exchanger are arranged radially around the vertical section of the subterranean heat exchanger.

20. The method of claim 17, wherein in the forming a subterranean heat exchanger, the subterranean heat exchanger is formed by drilling the underground formation.

21. The method of claim 17, wherein the first working fluid is in direct contact with the underground formation such that heat from the formation is transferred directly to the first working fluid.

\* \* \* \* \*